Figure 1:
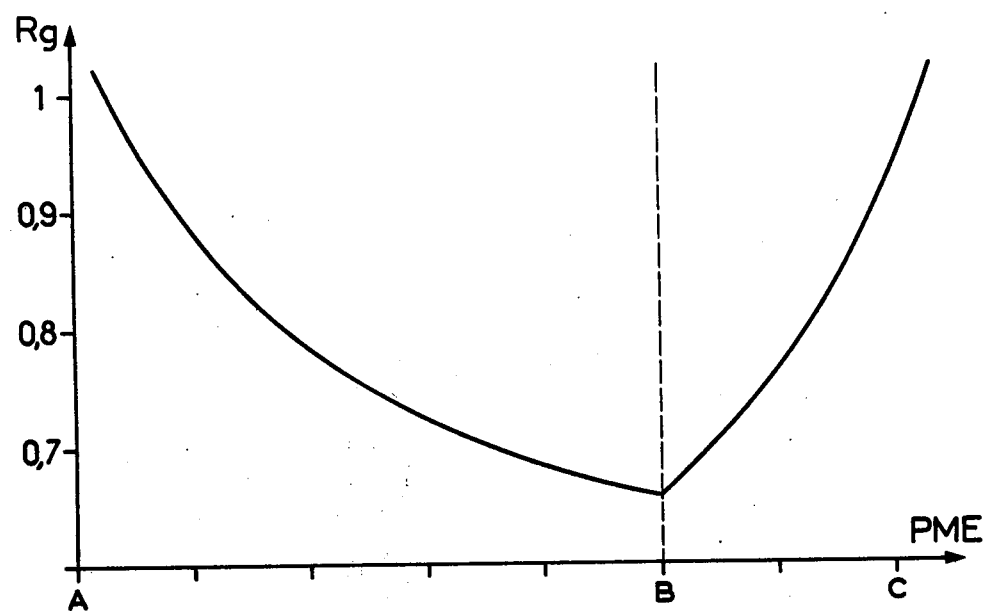

United States Patent [19]

Cochard et al.

[11] 4,188,923
[45] Feb. 19, 1980

[54] INTERNAL COMBUSTION ENGINE FUEL FEED

[75] Inventors: Pierre Cochard, Saint Germain les Arpajon; Christian Guicherd, Le Pecq, both of France

[73] Assignee: Regie Nationale des Usines Renault, Boulogne-Billancourt, France

[21] Appl. No.: 865,651

[22] Filed: Dec. 29, 1977

[30] Foreign Application Priority Data

Feb. 24, 1977 [FR] France ............................... 77 05481

[51] Int. Cl.² .................. F02B 3/04; F02B 23/10
[52] U.S. Cl. ............................ 123/32 ST; 123/32 SP; 123/191 S
[58] Field of Search .................. 123/140 CC, 140 MC, 123/140 MP, 32 ST, 32 D, 32 C, 32 SP, 196 SP, 97 B

[56] References Cited

U.S. PATENT DOCUMENTS

| | | | |
|---|---|---|---|
| 2,396,618 | 3/1946 | Stieglitz et al. | 123/140 MC |
| 2,849,992 | 9/1958 | Stillebroer et al. | 123/32 ST |
| 3,924,598 | 12/1975 | Davis | 123/32 ST |
| 3,967,595 | 7/1976 | Yagi et al. | 123/32 SP |
| 4,014,301 | 3/1977 | Happel | 123/32 ST |
| 4,104,337 | 8/1978 | Garcea | 123/97 B |

*Primary Examiner*—Charles J. Myhre
*Assistant Examiner*—P. S. Lall
*Attorney, Agent, or Firm*—Beveridge, De Grandi, Kline & Lunsford

[57] ABSTRACT

In a method and apparatus for controlling the fuel feed to a stratified-charge internal combustion engine, from idle up to the position corresponding with the maximum flow of air, the overall richness ($r_g$) of the combustible mixture is reduced by acting simultaneously upon the flow of fuel feeding the main chamber and upon the flow of fuel injected into the auxiliary chamber. For higher loads the maximum flow of air is kept constant and $r_g$ is increased by continuing to act upon both fuel flows. By keeping the richness of the mixture in the auxiliary chamber substantially constant, it is possible to obtain the best compromise between the performance of the engine and the emission of pollutant gases.

8 Claims, 6 Drawing Figures

INTERNAL COMBUSTION ENGINE FUEL FEED

This invention relates to regulation of the feed to a stratified-charge internal combustion engine, in particular for a motor vehicle, in which a plurality of combustion chambers is connected to a duct which feeds a combustible mixture to the chambers, and in which each combustion chamber comprises a main chamber and an auxiliary chamber which contains a spark plug and is equipped with an auxiliary feed device, for example a fuel injection device.

Stratified-charge engines of known type which offer the advantage of enabling reduction in the emission of toxic gases do not include means to enable regulation of intake as far as both proportioning of fuel and air intake are concerned. Hence, in these engines of known type it is not possible to obtain the best compromise as far as pollution of the exhaust gases is concerned, on the one hand, and the performance of the engine for all conditions of use, on the other.

Hence, in order to reduce as far as possible the emission of oxides of nitrogen in the exhaust gases, whilst preserving good performance of the engine, it is particularly advantageous to make the combustion engine operate with the lowest possible richness of the combustible mixture. It is therefore understood that this overall richness should be variable as a function of the operating conditions of the engine, that is to say as a function of the load which is demanded of it. Such variation of the richness is not readily compatible with the effective conditions of operation of a stratified charge engine in which the proportioning and richness of the combustible mixture in the auxiliary chamber in proximity to the sparking plug must be well defined and are hardly adaptable to variable working conditions.

An object of the present invention is to provide a method of regulation and a regulating apparatus in which the flow of air introduced into the main chamber and also the richness of the mixture corresponding with the flow of fuel introduced into the two chambers of the engine are both acted upon. The regulation is effected so as to obtain on the one hand the required power and on the other hand operation of the engine in a zone where the pollution is the lowest possible and the performance the best.

A further object of the invention is to enable regulation of the feed to the engine in a manner in which the richness of the combustible mixture in the auxiliary chamber in proximity to the spark plug is kept at a substantially constant value whatever the load on the engine, this value being chosen so as to minimize the emission of toxic gases for maximum performance.

In accordance with the invention, a method of regulation of the feed to a stratified-charge internal combustion engine of the aforesaid type comprises reducing the overall richness of the combustible mixture when the load applied to the engine increases from idle up to maximum flow of air upon opening wide the butterfly valve which is in the intake duct. This reduction in the overall richness of the combustible mixture is obtained by acting simultaneously upon the flow of fuel feeding the main chamber and upon the flow of fuel injected into the auxiliary chamber. When the load increases further, the flow of air is kept at its maximum constant value and the overall richness of the combustible mixture is increased by acting upon both the flow of fuel feeding the main chamber and the flow of fuel injected into the auxiliary chamber.

The reduction of the overall richness from idle up to full opening of the butterfly valve is effected preferably asymptotically, for example from 1 to 0.06. In the same way the subsequent increase in the overall richness is effected likewise asymptotically, the increase being, however, more rapid than the previous reduction. The overall richness then increases, the butterfly valve remaining completely open, as a function of the mean effective pressures up to full load and up to the normal value of 1, the richness depending upon the proportion of filling of the engine.

We have discovered, by means of experimental tests, the important influence of the richness of the mixture in the auxiliary chamber in proximity to the sparking plug. We found that an optimum zone of richness of the combustible mixture in the auxiliary chamber was located between 1.15 and 1.25, an excellent compromise then being able to be realised between good overall performance and minimum emissions of unburnt hydrocarbons, carbon monoxide and various oxides of nitrogen.

Preferably the amount of fuel injected into the auxiliary chamber is regulated as a function of the overall richness and of the filling in such a way that the richness of the combustible mixture in proximity to the spark plug at the instant of ignition remains constant and lies between about 1 and 1.25. To this end, the method of the invention comprises increasing for low loads the proportion of the flow of fuel injected into the auxiliary chamber with respect to the flow of fuel feeding the main chamber, then reducing this proportion for high loads. Under these conditions, at low operating speeds of the engine the injection of fuel into the auxiliary chamber contributes practically solely to keeping the richness of the mixture in the auxiliary chamber constant, the compressed gases coming from the main chamber and the mixture resulting from the feeding of that chamber being then weaker. For high speeds and heavy operating loads of the engine, the richness of the mixture feeding the main chamber increases whilst the flow of fuel injected into the auxiliary chamber is reduced, so that the richness of the mixture in the auxiliary chamber remains within the aforesaid limits.

Regulating the fuel feed in this manner enables the lowest emissions of various oxides of carbon and the lowest specific consumptions to be obtained, which it is possible to obtain with this type of stratified-charge engine for a given level of emission of unburnt hydrocarbons, whilst conferring upon the engine equal stability of running whatever the load and speed. Of course, if a higher level of emission of unburnt hydrocarbons is fixed, it is then possible to reduce the overall richness, which brings about a reduction in the emission of oxides of nitrogen.

The method of regulation of the invention may be carried out by any apparatus capable of ensuring the abovementioned functions.

In accordance with another aspect of the invention, regulating apparatus comprises two surfaces of revolution which act as three-dimensional cams on a shaft and are rotatable together under the action of the load control of the engine which may, for example, be the accelerator pedal of a motor vehicle. The two surfaces of revolution may likewise be moved in axial translation as a function of the flow of intake air. One of these surfaces of revolution co-operates with a first cam follower for control of the flow of fuel admitted into the main chamber. The other surface of revolution co-operates with a second cam follower for control of the flow of fuel admitted into the auxiliary chamber, for example by means of an injector device.

The radial dimensions of these surfaces of revolution are defined as a function of the different regulation parameters in order to provide directly the values of the flow of fuel admitted into the main chamber and into the auxiliary chamber, respectively.

The apparatus also includes a stop or like means capable of maintaining the butterfly valve, which is located in the intake manifold, in the open position for a position of the accelerator pedal lying on this side of the position corresponding to the maximum travel of the pedal, that is to say, with maximum load on the engine.

Figure 4:
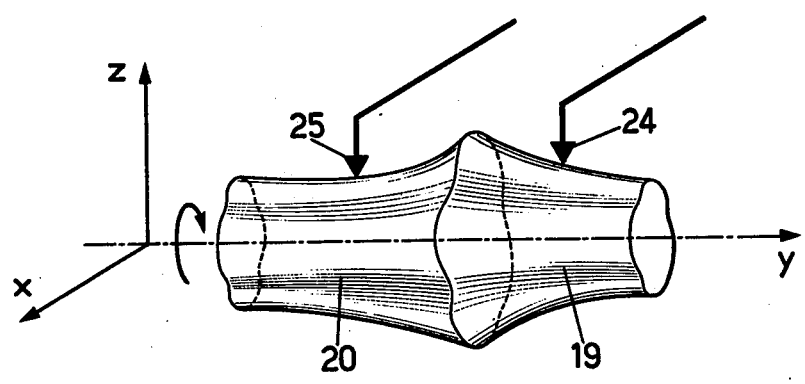
Figure 2A:
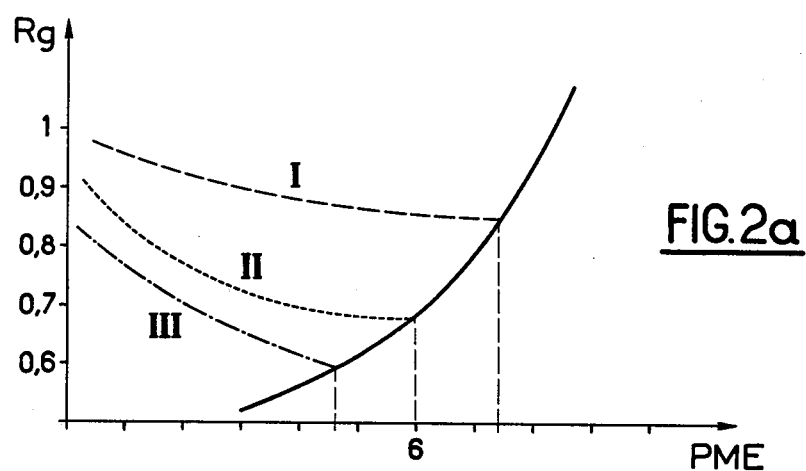
Figure 2B:
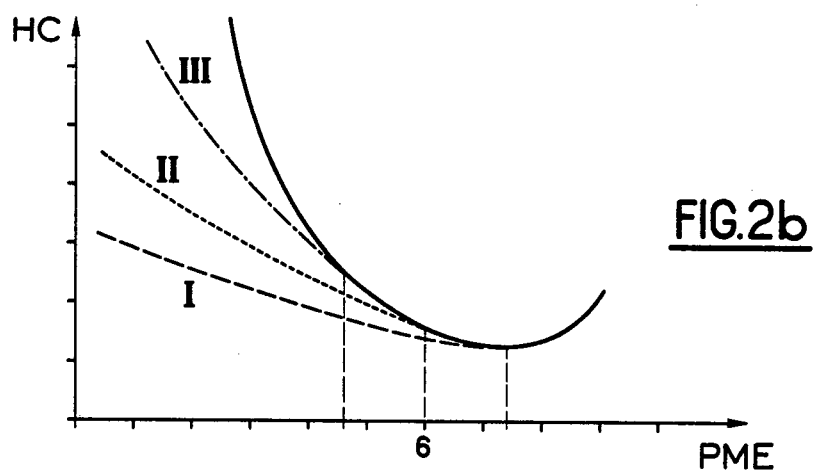
Figure 2C:
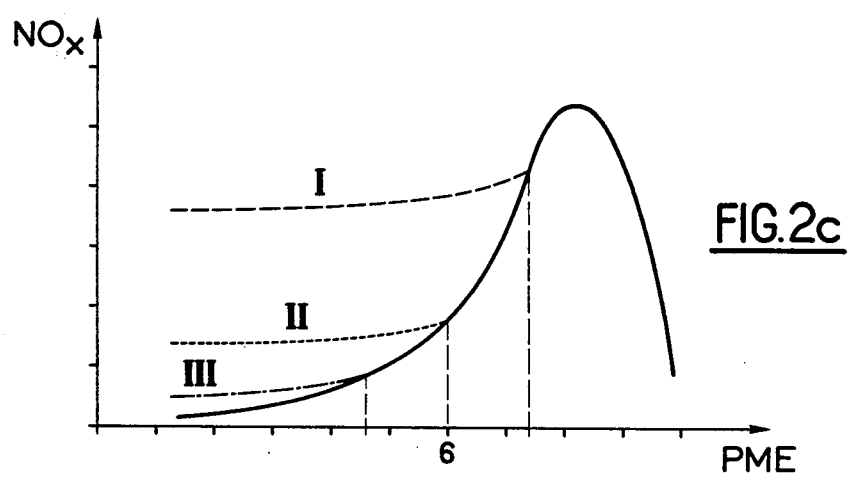
Figure 3:
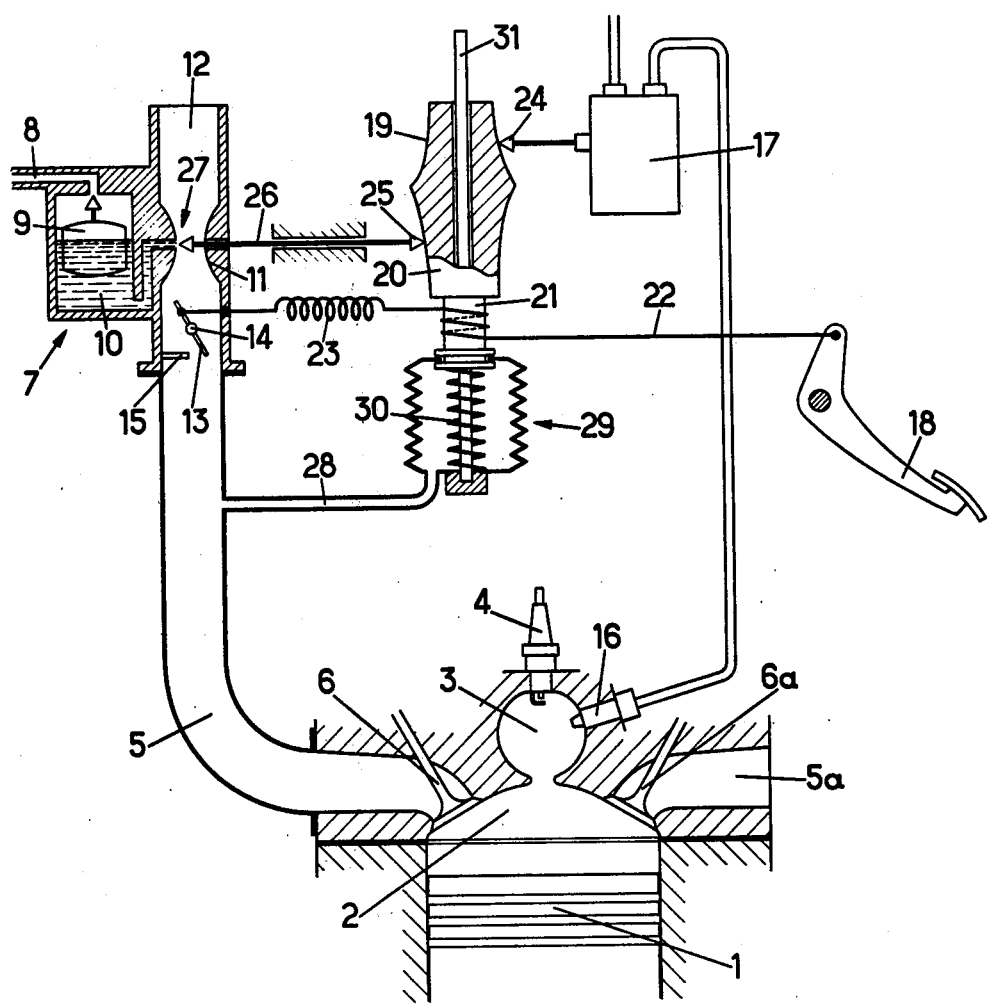

An embodiment of the invention will now be described, by way of example, with reference to the accompanying drawings, in which:

FIG. 1 is a graph showing the variation in the overall richness as a function of the mean effective pressure obtained by the method of regulation according to the invention, FIGS. 2a, 2b and 2c illustrate different possibilities of regulation in accordance with the invention and show, respectively, the variations in the overall richness, in the rate of emission of unburnt hydrocarbons and in the rate of emission of various oxides of nitrogen as a function of the mean effective pressure, FIG. 3 illustrates, diagrammatically, mechanical regulator apparatus in accordance with the invention, and FIG. 4 shows diagrammatically the surfaces of revolution which act as three-dimensional cams in the apparatus of FIG. 3.

FIG. 1 represents the variation in overall richness $r_g$ of the mixture of air and fuel introduced into the combustion chamber, that is to say both into the main chamber and into the auxiliary chamber, as a function of the load demanded of the engine, represented by the mean effective pressure (PME) which corresponds with the real mean pressure, i.e. after deduction of the resistance from friction which is exerted upon a piston moving in the cylinder. A point A on the graph corresponds with idle of the combustion engine, a point B with full opening of the butterfly valve and a point C with the full load of the engine which corresponds with the maximum travel of the accelerator pedal.

As may be seen in FIG. 1, the method of the invention provides a reduction in the overall richness $r_g$ asymptotically, for example from about 1 to about 0.6 from idle of the engine up to full opening of the butterfly valve, which corresponds to maximum flow of air and maximum filling.

When there is a subsequent increase in the load demanded of the engine, the butterfly valve remains completely open and the overall richness $r_g$ increases likewise asymptotically but more rapidly than it decreased previously. This increase is effected from about 0.6 up to normal richness of 1 as a function of the mean effective pressure and of the proportion of filling of the engine.

In FIG. 2a are represented other possibilities of regulation in accordance with the invention by making the overall richness vary to correspond with the maximum opening of the butterfly valve. Thus, in variant I the maximum flow of air corresponds with a richness of 0.85, in variant II with an overall richness of 0.68, and in variant III with an overall richness of 0.6. FIGS. 2b and 2c show, as a function of the regulation adopted, the variation in the rate of emission of unburnt hydrocarbons (HC) and in various oxides of nitrogen ($NO_x$). It will be observed that in variant I the hydrocarbons are less in amount, whilst the amount of oxides of nitrogen is greater. In variant III these proportions are substantially reversed.

Hence it may be seen that by the choice of the point of inflection of the curve representing the variation in the overall richness as a function of the mean effective pressure, a compromise may be arrived at between the emissions of the various pollutant gases in the exhaust.

The mechanical regulator apparatus illustrated in the diagrammatic view in FIG. 3 cooperates with a stratified-charge internal combustion engine for a motor vehicle in which a piston 1 cooperates with a main combustion chamber 2 connected at its top portion to an auxiliary chamber 3 containing a spark plug 4. The combustible mixture is admitted into the main chamber 2 through an intake duct 5 which is closable by an inlet valve 6. The burnt gases are exhausted through an exhaust pipe 5a which is closable by an exhaust valve 6a. A carburetor 7 is connected to a fuel tank (not shown) through a pipe 8, the orifice of which is controlled by a float 9 moving in a float-chamber 10. The fuel is admitted into a venturi 11 and is mixed with air from a duct 12. A butterfly valve 13 can pivot about its axis 14 and can occupy a completely open position where it comes into contact with a stop 15. This position corresponds to maximum flow of air or maximum filling. The auxiliary chamber 3 includes an injector device 16 fed with fuel by an injector pump 17. An accelerator pedal 18 controls the position of the butterfly valve 13, thus controlling the fuel feed demanded of the internal combustion engine.

The regulator device of the invention comprises a member having two surfaces of revolution 19 and 20 integral with a drum 21 about which is wound a cord 22 which connects the accelerator pedal 18 to the butterfly valve 13 by way of a tension spring 23. The surface of revolution 19 acts as a three-dimensional cam which cooperates with a cam follower 24 connected to the injector pump 17 so as to control the flow of fuel injected into the auxiliary chamber 3. The body of revolution 20, acting as a three-dimensional cam likewise cooperates with a cam follower 25 which is connected by way of a rod 26 to a variable nozzle 27 which controls the flow of fuel introduced into the intake manifold 5 from the carburetor float-chamber 10. The variable negative pressure prevailing in the intake manifold 5 is transmitted by pipework 28 to a variable volume 29 the top wall of which bears directly against the bottom of the drum 21 against the force of a return spring 30. Hence the assembly comprising the two three-dimensional cams 19 and 20 and the drum 21 can move axially with respect to a spindle 31 which passes through these parts.

The device of the invention operates in the following manner. Regulation of the air intake, i.e. of the flow of air admitted into the combustion chamber, is ensured by rotation of the drum 21, and hence the three-dimensional cams 19 and 20 which are integral with it, from the motion of the accelerator pedal 18 which controls the position of the butterfly valve 13 or any other similar device which enables the area of flow of the air to be restricted. Opening of the butterfly valve, thereby increasing the flow of air, is obtained progressively in proportion as the accelerator pedal 18 is pushed down from idle, corresponding with the Point A in FIG. 1, up to the position of maximum opening of the butterfly valve, corresponding with Point B in FIG. 1, at which the butterfly valve comes into contact with the stop 15.

During this rotation, control of the overall richness $r_g$ is ensured by the addition of two flows of fuel; namely the fuel flow $m_i$ injected or admitted into the auxiliary chamber 3, and the petrol flow $m_c$ admitted into the main chamber 2.

These two flows are regulated during the course of the rotation of the three-dimensional cams 19 and 20 by the motion of the cam followers 24 and 25 which control, respectively, the injector pump 17 and the variable nozzle 27.

From the Point B (FIG. 1) which corresponds with the maximum opening of the butterfly valve 13 it is still possible to increase the load on the combustion engine by continuing to depress the accelerator pedal 18. This action causes further rotation of the three-dimensional cams 19 and 20, still in the same direction, thanks to the presence of the spring 23 which elongates, the butterfly valve 13 remaining in the position of maximum opening against the stop 15.

FIG. 4 shows diagrammatically the two bodies of revolution 19 and 20 employed in the mechanical regulator device of the invention, represented in perspective on a system of mutually perpendicular axes x, y and z. The assembly of the two three-dimensional cams 19 and 20 can be moved longitudinally along the y axis and can be rotated about the same axis. The particular shape of the surfaces of revolution of the bodies 19 and 20 is chosen so as to ensure the desired regulation and in such a way that the richness of the mixture at the instant of ignition in proximity to the sparking plug in the auxiliary chamber 3 remains approximately constant and lies between 1 and 1.25.

In such a stratified-charge engine with injection into the auxiliary chamber, it can be shown that the flow of fuel feeding the main chamber is given by the formula:

$$m_c = K/AR[r_g(A+1) - r_{px}] \quad (1)$$

where:
- $m_c$ is the flow of fuel feeding the main chamber;
- K is a coefficient characterising the combustion conditions, which depends upon the cylinder capacity of the engine, the specific mass of the air and the nature of the fuel;
- A is a constant representing the ratio of the volume of the main chamber at the instant of ignition to the volume of the auxiliary chamber;
- R is the rate of air intake;
- $r_g$ is the overall richness of the combustible mixture; and
- $r_{px}$ is the richness of the combustible mixture in the auxiliary chamber at the instant of ignition.

If the coordinates x, y and z of a geometrical body in space are then defined so that:

$$x = r_g; \quad y = R \text{ and } z = m_c;$$

an angle $\beta$ being defined by the formula:

$$\beta = r_g(A+1) - r_{px};$$

the formula (1) is transformed into:

$$z = K/A \cdot y \cdot \beta \quad (2)$$

which corresponds with a body of revolution which may be moved in translation along the y axis and can be rotated about this axis according to an angle $\beta$. Hence, one does indeed obtain the desired variation in the flow of fuel into the main chamber as a function of the angle of rotation of the three-dimensional cam 20 depending upon the position of the accelerator pedal 18 and as a function of the negative pressure in the intake manifold.

In the same way it may be shown that the flow of fuel $m_i$ by injection into the auxiliary chamber is defined by the formula:

$$m_i = K/AR(r_{px} - r_g) \quad (3)$$

If in this formula one defines the three coordinate axes x, y and z of a body of revolution as:

$$x = r_g; \quad y = R; \text{ and } z = m_i;$$

an angle of rotation $\beta'$ being defined by the formula:

$$\beta' = (r_{px} - r_g) \quad (4)$$

the formula (3) is transformed into:

$$z = K/A \cdot y \cdot \beta' \quad (5)$$

which corresponds with a body of revolution which can undergo a rotation about the y axis by an angle $\beta'$ and an axial movement along this axis of a value y which is the same as the preceding value, since it corresponds with the filling which is provided by the depression in the inlet manifold.

Hence, it is possible to realise the regulation of the invention by joining the two bodies of revolution 19 and 20 side by side, the longitudinal movement of which bodies will then be the same. The two functions corresponding to the flows feeding the main chamber and the auxiliary chamber will be provided by the profile of the bodies of revolution 19 and 20. It will be observed that the regulation might be obtained by means of two independent bodies of revolution at the cost of a certain complication of the mechanism.

We claim:

1. A method of regulating the feed to a stratified charge internal combustion engine having a combustion chamber, including a main chamber, with means for feeding a combustible mixture of fuel and air thereto and a throttle valve for controlling the flow of air, and an auxiliary chamber, with means for injecting fuel thereto and igniting means, the method comprising:

(a) while increasing the load on the engine, acting on the throttle valve to increase the flow of air from that at idle to the maximum flow of air and simultaneously varying the flow of fuel in the combustible mixture of fuel and air fed to the main chamber and the flow of fuel injected to the auxiliary chamber to decrease the overall richness of the mixture of fuel and air in the combustion chamber from that at idle to a minimum value corresponding to the maximum flow of air; and (b) while further increasing the load on the engine, maintaining the throttle valve to provide the maximum flow of air and simultaneously varying the flow of fuel in the combustible mixture of fuel and air fed to the main chamber and the flow of fuel injected to the auxiliary chamber to increase the overall richness of the mixture of fuel and air in the combustion chamber from the minimum value to 1.

2. A method as claimed in claim 1, wherein the decrease in overall richness is effected asymptotically, the subsequent increase being effected more rapidly and likewise asymptotically.

3. A method as claimed in claim 1, wherein the richness of the combustible mixture in the auxiliary chamber is kept substantially constant whatever the load on the combustion engine by increasing for low loads the proportion of the flow of fuel injected into the auxiliary chamber with respect to the flow of fuel admitted into the main chamber and by reducing the said proportion for high loads.

4. A method as claimed in claim 3, wherein the richness of the combustible mixture in the auxiliary chamber is kept at a constant value lying between about 1 and about 1.25.

5. A method of regulating the feed to a stratified charge internal combustion engine having a combustion chamber, including a main chamber, with means for feeding a combustible mixture of fuel and air thereto and a throttle valve for controlling air, and an auxiliary chamber, with means for injecting fuel thereto and igniting means, the method comprising:

(a) while increasing the load on the engine, acting on the throttle valve to increase the flow of air from that at idle to the maximum flow of air and simultaneously controlling the flow of fuel to decrease the richness of the fuel-air mixture fed to the main chamber and to increase the flow of fuel injected to the auxiliary chamber in such a way that the overall richness of the mixture of fuel and air in the combustion chamber decreases from 1 at idle to a minimum value corresponding to the maximum flow of air;

(b) while further increasing the load on the engine, maintaining the throttle valve in a position providing the maximum flow of air and simultaneously controlling the flow of fuel to increase the richness of the fuel-air mixture fed to the main chamber and to decrease the flow of fuel injected to the auxiliary chamber in such a way that the overall richness of the mixture of fuel and air in the combustion chamber increases from the minimum value to 1; and (c) during steps (a) and (b) maintaining the richness of the fuel-air mixture near the igniting means in the auxiliary chamber substantially constant for any load of the engine.

6. A method as claimed in claim 5, wherein the decrease in overall richness is effected asymptotically, the subsequent increase being effected more rapidly and likewise asymptotically.

7. A method as claimed in claim 5, wherein the richness of the combustible mixture in the auxiliary chamber is kept substantially constant whatever the load on the combustion engine by increasing for low loads the proportion of the flow of fuel injected into the auxiliary chamber with respect to the flow of fuel admitted into the main chamber and by reducing the said proportion for high loads.

8. A method as claimed in claim 7, wherein the richness of the combustible mixture in the auxiliary chamber is kept at a constant value lying between about 1 and about 1.25.

* * * * *